(12) United States Patent
Chen et al.

(10) Patent No.: US 11,043,872 B2
(45) Date of Patent: Jun. 22, 2021

(54) MOTOR DRIVING DEVICE

(71) Applicant: FANUC CORPORATION, Yamanashi (JP)

(72) Inventors: Jianzhou Chen, Yamanashi-ken (JP);
Naoki Masuda, Yamanashi-ken (JP);
Shinichi Mizukami, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 16/295,032

(22) Filed: Mar. 7, 2019

(65) Prior Publication Data
US 2019/0280551 A1     Sep. 12, 2019

(30) Foreign Application Priority Data

Mar. 9, 2018   (JP) .............................. JP2018-042596

(51) Int. Cl.
*H02K 5/10*     (2006.01)
*H02K 11/33*    (2016.01)
*H02K 9/04*     (2006.01)

(52) U.S. Cl.
CPC ............... *H02K 5/10* (2013.01); *H02K 9/04* (2013.01); *H02K 11/33* (2016.01); *H02K 2211/03* (2013.01)

(58) Field of Classification Search
CPC . H02K 5/10; H02K 11/33; H02K 9/04; H02K 2211/03; H02K 9/00; H02K 9/005;
(Continued)

(56) References Cited

U.S. PATENT DOCUMENTS

2006/0044762 A1   3/2006  Kikuchi et al.
2014/0043778 A1*  2/2014  Chou ............... H05K 1/181
                                                361/752
(Continued)

FOREIGN PATENT DOCUMENTS

CN   104684355 A   6/2015
CN   104703838 A   6/2015
(Continued)

OTHER PUBLICATIONS

Suzuki Keizo, Printed Board Mounting System, Fujitsu LTD, JP 63-220600 (English Machine Translation) (Year: 1988).*
(Continued)

*Primary Examiner* — Quyen P Leung
*Assistant Examiner* — Alexander A Singh
(74) *Attorney, Agent, or Firm* — Fredrikson & Byron, P.A.

(57) ABSTRACT

A motor driving device includes: a printed circuit board; a surface mounted component group of multiple surface mounted components surface-mounted on a printed surface of the printed circuit board; a heat-generating component group of multiple heat-generating components that generate an amount of heat equal to or larger than a predetermined amount, the heat-generating component group being provided on the printed surface side of the printed circuit board; a fan configured to blow air to the heat-generating component group to thereby cool the heat-generating components; and a cover configured to block flow of air blown by the fan so that the air blown by the fan will not flow to the surface mounted components.

2 Claims, 4 Drawing Sheets

(58) Field of Classification Search
CPC .. H02K 9/02; H02K 9/06; H02K 9/08; H02K 9/10; H02K 9/19; H02K 9/193; H02K 9/20; H02K 9/24; H05K 5/03; H05K 5/0217; H05K 7/20; H05K 7/20136; H01R 13/5227; H01L 23/467; H02B 1/28; H02B 1/56
USPC ..... 310/52, 54, 55, 56, 57, 58, 59, 60 R, 62, 310/63
See application file for complete search history.

(56) References Cited

U.S. PATENT DOCUMENTS

| | | | | |
|---|---|---|---|---|
| 2014/0085820 | A1* | 3/2014 | Yamamoto | H05K 7/20909 361/695 |
| 2015/0130386 | A1 | 5/2015 | Zumstein et al. | |
| 2015/0362262 | A1 | 12/2015 | Sekikawa | |
| 2017/0339801 | A1* | 11/2017 | Sasaki | H05K 7/20 |

FOREIGN PATENT DOCUMENTS

| | | | |
|---|---|---|---|
| CN | 104756027 | A | 7/2015 |
| CN | 106992736 | A | 7/2017 |
| JP | 63220600 | * | 9/1988 |
| JP | 426586 | U | 3/1992 |
| JP | H05038984 | U | 5/1993 |
| JP | H05267874 | A | 10/1993 |
| JP | 7221477 | A | 8/1995 |
| JP | H08250880 | A | 9/1996 |
| JP | 2003017882 | A | 1/2003 |
| JP | 2003025935 | A | 1/2003 |
| JP | 200949955 | A | 3/2009 |
| JP | 1404726 | B2 | 1/2010 |
| JP | 5056390 | B2 | 10/2012 |
| JP | 20164891 | A | 1/2016 |
| JP | 201625190 | A | 2/2016 |
| JP | 2017017147 | A | 1/2017 |
| JP | 6162841 | B2 | 7/2017 |
| WO | 2015104807 | A1 | 7/2015 |
| WO | 2016185613 | A1 | 11/2016 |

OTHER PUBLICATIONS

English Machine Translation of Notice of Reasons for Refusal mailed by Japan Patent Office for Japanese Application No. JP2018-042596, dated Dec. 10, 2019, 7 pgs. (citing Japanese Publication No. H04-026586 U, published Mar. 3, 1992).
English Abstract and Machine Translation for Japanese Publication No. JP2003-017882A, published Jan. 17, 2003, 5 pgs.
English Abstract for Japanese Publication No. 2016004891 A, published Jan. 12, 2016, 1 pg.
English Abstract and Machine Translation for Japanese Publication No. 2016-025190 A, published Feb. 8, 2016, 10 pgs.
English Abstract for Japanese Publication No. 4404726 B2, published Jan. 27, 2010, 2 pgs.
English Abstract and Machine Translation for Japanese Publication No. 5056390 B2, published Oct. 24, 2012, 7 pgs.
English Abstract and Machine Translation for Japanese Publication No. 6162841 B2, published Jul. 12, 2017, 6 pgs.
English Abstract and Machine Translation for Chinese Publication No. 104756027 A, published Jul. 1, 2015, 33 pgs.
English Abstract and Machine Translation for Japanese Publication No. JPH05-038984U, published May 25, 1993, 5 pgs.
English Abstract and Machine Translation for Japanese Publication No. JPH05-267874A, published Oct. 15, 1993, 9 pgs.
English Abstract and Machine Translation for Japanese Publication No. JPH08-250880A, published Sep. 27, 1996, 5 pgs.
English Abstract and Machine Translation for Japanese Publication No. JP2003-025935A, published Jan. 29, 2003, 6 pgs.
English Abstract and Machine Translation for Japanese Publication No. JP2017-017147A, published Jan. 19, 2017, 8 pgs.
English Machine Translation of Decision to Grant a Patent mailed by Japan Patent Office (JPO) for Application No. JP2018-042596, dated Jun. 2, 2020, 2 pages.
Untranslated Decision to Grant a Patent mailed by Japan Patent Office (JPO) for Application No. JP2018-042596, dated Jun. 2, 2020, 3 pages.
English Machine Translation of Notification of Reasons for Refusal mailed by Japan Patent Office (JPO) for Application No. JP2018-042596, dated Mar. 3, 2020, 5 pages.
Untranslated Notification of Reasons for Refusal mailed by Japan Patent Office (JPO) for Application No. JP2018-042596, dated Mar. 3, 2020, 5 pages.
English Machine Translation of Notification of Reasons for Refusal mailed by Japan Patent Office (JPO) for Application No. JP2018-042596, dated Dec. 10, 2019, 7 pages.
Untranslated Notification of Reasons for Refusal mailed by Japan Patent Office (JPO) for Application No. JP2018-042596, dated Dec. 10, 2019, 9 pages.
English Abstract and Machine Translation for International Publication No. WO 20161185613 A1, published Nov. 24, 2016, 15 pgs.
English Abstract and Machine Translation for Japanese Publication No. 2009-049955 A, published Mar. 5, 2009, 8 pgs.
English Abstract and Machine Translation for Japanese Publication No. H07-221477 A, published Aug. 18, 1995, 7 pgs.
Brief English Machine Description for Japanese Publication No. H04-026586 U, published Mar. 3, 1992, 2 pgs.
English Abstract and Machine Translation for Chinese Publication No. CN104684355A, published Jun. 3, 2015, 5 pgs.
English Abstract and Machine Translation for Chinese Publication No. CN104703838A, published Jun. 10, 2015, 11 pgs.
English Abstract and Machine Translation for International Publication No. WO2015/104807A1, published Jul. 16, 2015, 11 pgs.
English Abstract and Machine Translation for Chinese Publication No. CN106992736A, published Jul. 28, 2017, 7 pgs.

* cited by examiner

MOTOR DRIVING DEVICE

CROSS-REFERENCE TO RELATED APPLICATION

This application is based upon and claims the benefit of priority from Japanese Patent Application No. 2018-042596 filed on Mar. 9, 2018, the contents of which are incorporated herein by reference.

BACKGROUND OF THE INVENTION

Field of the Invention

The present invention relates to a motor driving device for driving a motor.

Description of the Related Art

Japanese Laid-Open Patent Publication No. 2016-004891 discloses a cooling device. In this disclosure, when a cooling device is installed in a control panel under an environment where a mist of cutting fluid exists, it proposes provision of a mist collector for collecting the mist in the cooling device in order to prevent electronic components from being damaged by air containing a mist of cutting fluid blown from the cooling device.

SUMMARY OF THE INVENTION

However, in Japanese Laid-Open Patent Publication No. 2016-004891, the structure of the cooling device becomes complicated.

It is therefore an object of the present invention to provide a motor driving device having a simple configuration which can prevent failures of electronic components while cooling heat-generating components in the motor driving device.

An aspect of the present invention resides in a motor driving device, which includes: a printed circuit board; a surface mounted component group of a plurality of surface mounted components surface-mounted on a printed surface of the printed circuit board; a heat-generating component group of a plurality of heat-generating components that generate an amount of heat equal to or larger than a predetermined amount, the heat-generating component group being provided on the printed surface side of the printed circuit board; a fan configured to blow air to the heat-generating component group to thereby cool the heat-generating components; and a cover configured to block flow of air blown by the fan so that the air blown by the fan will not flow to the surface mounted components.

According to the present invention, with a simple configuration, it is possible to cool the heat-generating components by the air blown from the fan while preventing the air blown by the fan from flowing toward the surface mounted components. Therefore, it is possible to prevent the surface mounted components from being damaged due to the atomized liquid contained in the air blown by the fan.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A motor driving device according to the present invention will be detailed below by describing preferred embodiments with reference to the accompanying drawings.

First Embodiment

Figure 1:
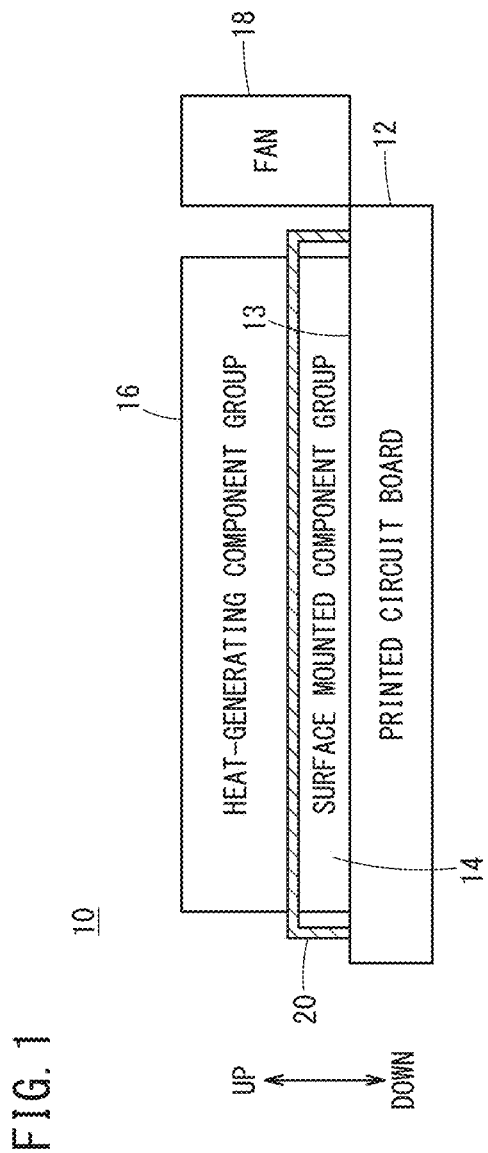
FIG. 1 is a sectional side view showing an example of a schematic configuration of a motor driving device according to a first embodiment.

FIG. 1 is a sectional side view showing an example of a schematic configuration of a motor driving device 10 according to a first embodiment. In the following description, the upward and downward directions will be described based on the directions of the arrows shown in FIG. 1. The motor driving device 10 is a driving device for driving a motor.

The motor driving device 10 includes a printed circuit board 12, a surface mounted component group 14 of multiple surface mounted components which are surface-mounted on a printed surface (front surface) 13 of the printed circuit board 12, a heat-generating component group 16 of multiple heat-generating components mounted on the printed surface 13 side of the printed circuit board 12, and a fan 18 for blowing air to the heat-generating component group 16 to cool the heat-generating components.

Here, atomized liquid such as misty cutting fluid is drifting in the ambient air around a machine tool or the like in which the motor driving device 10 is installed. Therefore, air blown by the fan 18 contains an atomized liquid. Hereinafter, the atomized liquid will be simply called the mist.

An example of a surface mounted component may include an IC (Integrated Circuit) or the like, but should not be limited to this. Any components may be used as long as they can be surface-mounted on the printed surface 13 of the printed circuit board 12. The surface mounted components are electronic components whose amount of heat generation is smaller than a predetermined level and which are prone to fail due to the mist. This failure is caused, for example, by insulation failure.

A heat-generating component is a component that is other than the surface mounted components and generates an amount of heat which is equal to or more than a predetermined amount. An example of such a heat-generating component includes components provided to supply a large current to the motor. The heat-generating component group 16 includes heat-generating components such as bus bars and capacitors.

The fan 18 blows air to the heat-generating component group 16 to cool the heat-generating components generating a large amount of heat. In the embodiment, the fan 18 is arranged so as to be able to blow air to the heat-generating component group 16 from a direction intersecting the vertical direction.

The air blown from this fan 18 to the heat-generating component group 16 also flows toward the surface mounted component group 14. As described above, the air blown from the fan 18 contains mist therein. Therefore, the mist adheres to the surface mounted components as the air is blown by the fan 18, and as a result, the surface mounted components may be damaged.

To deal with this, in the present embodiment, a cover 20 for blocking flow of air blown by the fan 18 is provided so that the air blown by the fan 18 will not flow toward the surface mounted components. The cover 20 covers the surface mounted component group 14 from an opposite side of the surface mounted component group 14 from the printed surface 13. That is, the cover 20 covers the surface mounted component group 14 from above. The cover 20 covers the top and sides of the surface mounted component group 14. In particular, the cover 20 covers a side of the surface mounted component group 14 that faces the fan 18. This makes it possible to prevent the surface mounted components from failing due to the air blown by the fan 18.

Here, in the heat-generating component group 16, there are some heat-generating components (for example, capacitors, etc.) that need to be attached to the printed surface 13 of the printed circuit board 12. Therefore, if the cover 20 also covers such a heat-generating component that needs to be attached to the printed circuit board 12, the heat-generating component cannot be cooled by the fan 18.

Figure 2:
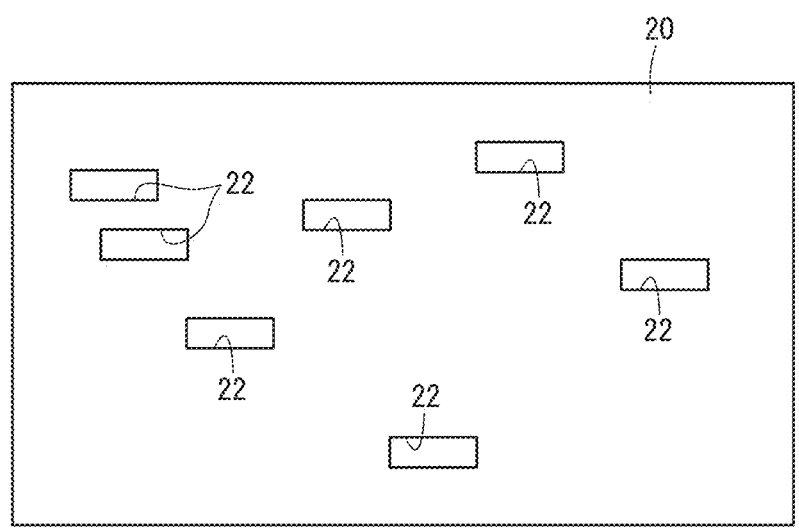
FIG. 2 is a plan view of a cover as viewed from the upper side of the cover provided on a printed circuit board.

To deal with this, openings 22 are formed in the cover 20 as shown in FIG. 2 in order to expose the heat-generating components (heat-generating components located within the cover 20) which need to be attached to the printed surface 13 of the printed circuit board 12. The size of the opening 22 is large enough to expose a heat-generating component that needs to be attached to the printed circuit board 12 while covering the surface mounted components around the heat-generating component. In the example shown in FIG. 2, since there are multiple heat-generating components that need to be attached to the printed circuit board 12 (printed surface 13), multiple openings 22 are provided in the cover 20 accordingly. FIG. 2 is a plan view of the cover 20 as viewed from the upper side of the cover 20 provided on the printed circuit board 12.

Figure 3:
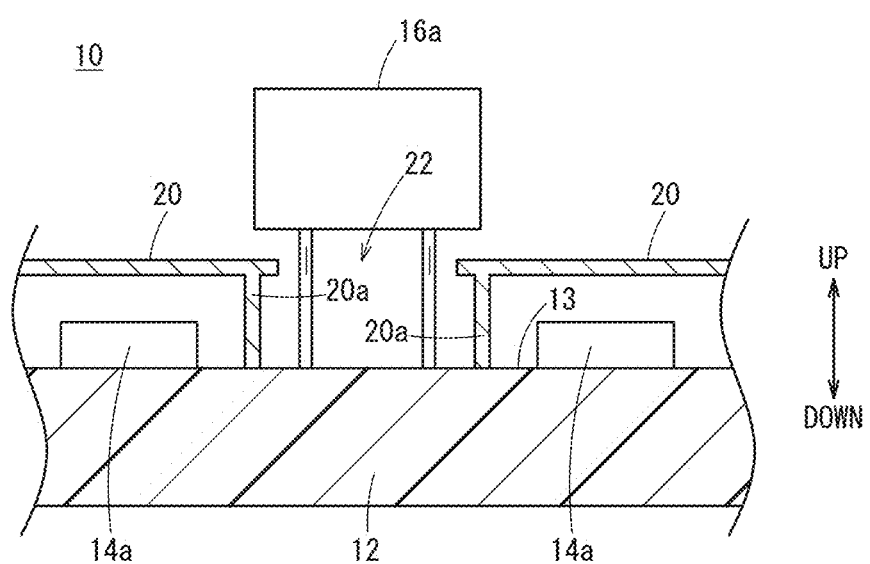
FIG. 3 is a partial sectional side view showing the relationship between a heat-generating component, surface mounted components and a cover attached to the printed surface of the printed circuit board.

FIG. 3 is a partial sectional side view showing the relationship between a heat-generating component, surface mounted components and the cover 20 attached to the printed surface 13 of the printed circuit board 12. Here, a reference numeral 14a in FIG. 3 denotes surface mounted components, and a reference numeral 16a denotes a heat-generating component.

As shown in FIG. 3, since the heat-generating component 16a such as a capacitor attached to the printed circuit board 12 is arranged in the opening 22, the heat-generating component 16a attached to the printed circuit board 12 can be exposed to the outside of the cover 20. In addition, the surface mounted components 14a around the heat-generating component 16a attached to the printed circuit board 12 are covered with the cover 20.

As a result, the cover 20 can protect the surface mounted components 14a from the air (containing mist) blown (delivered) from the fan 18, and the heat-generating component 16a attached to the printed circuit board 12 can be cooled by the air blown from the fan 18.

Here, in order to prevent the air (containing mist) blown from the fan 18 from entering the interior of the cover 20 through the opening 22, the cover 20 is provided with a protective wall 20a. The protective wall 20a may be arranged along the edge of the opening 22 or may be arranged outside the edge of the opening 22 and along a direction intersecting the vertical direction. This provision of the protective wall 20a makes it possible to more effectively protect the surface mounted components 14a from the air (containing mist) blown by the fan 18.

Here, the area where the surface mounted components 14a are arranged and the area where the heat-generating component group 16 is arranged may at least partially overlap with each other, when viewed from the direction orthogonal to the printed surface 13.

Second Embodiment

Figure 4:
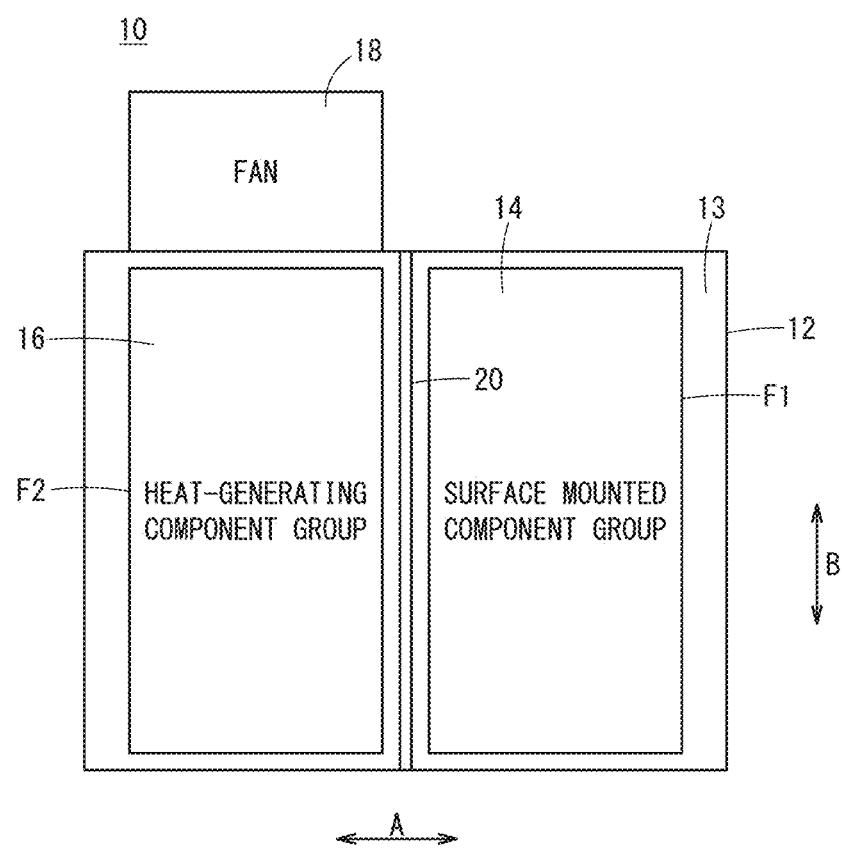
FIG. 4 is a plan view showing an example of a schematic configuration of a motor driving device according to a second embodiment.

FIG. 4 is a plan view showing an example of a schematic configuration of a motor driving device 10 according to a second embodiment. Components having the same functions as those in the first embodiment are denoted by the same reference numerals, and different points will be explained.

Also in the second embodiment, surface mounted components 14a are surface-mounted on the printed surface 13 of the printed circuit board 12, and heat-generating components 16a are provided on the printed surface 13 side of the printed circuit board 12. However, unlike the first embodiment, when viewed from a direction (for example, upward direction) orthogonal to the printed surface 13, an area F1 where the surface mounted component group 14 of multiple surface mounted components 14a is arranged and an area F2 where the heat-generating component group 16 of the multiple heat-generating components 16a is arranged do not overlap with each other and are separated from each other.

Specifically, when viewed from above, the area (first area) F1 where the surface mounted component group 14 is arranged is located on one end side of the printed circuit board 12 (printed surface 13) in a predetermined direction A (on the right side in FIG. 4), while the area (second area) F2 where the heat-generating component group 16 is disposed is located on the other end side (the left side in FIG. 4) of the printed circuit board 12 (printed surface 13) in the direction A. The area F1 and the area F2 are spaced a predetermined distance from each other in the A direction.

When viewed from above, the fan 18 blows air in the direction B intersecting (e.g., orthogonal to) the direction A to thereby cool the heat-generating component group 16. Therefore, the fan 18 is located on the other end side (the left side in FIG. 4) in the direction A and outside the heat-generating component group 16 in the direction B. With this configuration, the air blown from the fan 18 can flow to the heat-generating component group 16 while the air (containing mist) blown by the fan 18 hardly flows to the surface mounted component group 14. As a result, it is possible to prevent the surface mounted components 14a from being damaged due to the air blown by the fan 18.

Further, the cover 20 is located between the areas F1 and F2. The cover 20 extends in the direction B and blocks flow of air blown by the fan 18 so that the air blown by the fan 18 will not flow to the surface mounted component group 14. That is, the cover 20 covers the surface mounted component group 14 from the other end side in the direction A (the heat-generating component group 16 side). This makes it possible to reliably prevent the air blown by the fan 18 from flowing to the surface mounted component group 14 and prevent the surface mounted components 14a from being damaged by the air blown by the fan 18.

[Technical Ideas Obtained From Embodiment]

Technical ideas that can be grasped from the above embodiments will be described below.

The motor driving device (10) includes: a printed circuit board (12); a surface mounted component group (14) of a plurality of surface mounted components (14a) surface-mounted on a printed surface (13) of the printed circuit board (12); a heat-generating component group (16) of a plurality of heat-generating components (16a) that generate an amount of heat equal to or larger than a predetermined amount, the heat-generating component group being provided on the printed surface (13) side of the printed circuit board (12); a fan (18) configured to blow air to the heat-generating component group (16) to thereby cool the heat-generating components (16a); and a cover (20) configured to block flow of air blown by the fan (18) so that the air blown by the fan (18) will not flow to the surface mounted components (14a).

Thus, with a simple configuration, it is possible to cool the heat-generating components (16a) by the air blown from the fan (18) while preventing the air blown by the fan (18) from flowing to the surface mounted components (14a). Therefore, it is possible to prevent the surface mounted components (14a) from failing due to the atomized liquid contained in the air blown by the fan (18).

The cover (20) may be configured to cover the surface mounted component group (14) from an opposite side of the surface mounted component group (14) from the printed surface (13). This makes it possible to protect the surface mounted components (14a) from the blown air from the fan (18) and prevent the surface mounted components (14a) from being damaged.

In order to cool the heat-generating components (16a) attached to the printed surface (13), an opening (22) configured to expose the heat-generating components (16a) attached to the printed surface (13) may be formed in the cover (20). This makes it possible to protect the surface mounted components (14a) from the blown air from the fan (18) while cooling the heat-generating components (16a) attached to the printed surface (13).

The cover (20) may be provided with a protective wall (20a) configured to prevent the air blown by the fan (18) from entering the interior of the cover (20) through the opening (22). This makes it possible to cool the heat-generating components (16a) attached to the printed surface (13) while reliably protecting the surface mounted components (14a) from the blown air from the fan (18).

When the printed circuit board (12) is viewed in a direction orthogonal to the printed surface (13), the area where the heat-generating component group (16) is arranged and the area where the surface mounted component group (14) is arranged may at least partially overlap with each other.

When the printed circuit board (12) is viewed from a direction orthogonal to the printed surface (13), a first area (F1) where the surface mounted component group (14) is arranged may be located on one end side of the printed circuit board (12) in a predetermined direction while a second area (F2) where the heat-generating component group (16) is arranged may be located on another end side of the printed circuit board (12) in the predetermined direction. The fan (18) may be configured to blow air in a direction intersecting with the predetermined direction to thereby cool the heat-generating components (16a), when the printed circuit board (12) is viewed from the direction orthogonal to the print surface (13). The cover (20) may be provided between the first area (F1) and the second area (F2). With this configuration, it is possible to reliably prevent the air blown by the fan (18) from flowing toward the surface mounted components (14a), hence prevent the surface mounted components (14a) from being damaged due to the blown air from the fan (18).

While the invention has been particularly shown and described with reference to the preferred embodiments, it will be understood that variations and modifications can be effected thereto by those skilled in the art without departing from the scope of the invention as defined by the appended claims.

What is claimed is:

1. A motor driving device comprising:
   a printed circuit board;
   a surface mounted component group of a plurality of surface mounted components surface-mounted on a printed surface of the printed circuit board;
   a heat-generating component group of a plurality of heat-generating components that generate an amount of heat equal to or larger than a predetermined amount, the heat-generating component group being provided on a printed surface side of the printed circuit board;
   a fan configured to blow air to the heat-generating component group to thereby cool the heat-generating components; and
   a cover configured to cover the surface mounted component group from an opposite side of the surface mounted component group from the printed surface and configured to block flow of air blown by the fan so that the air that is blown by the fan and contains mist will not flow to the surface mounted components,
   wherein an amount of heat generation of the plurality of surface mounted components are smaller than the predetermined level,
   the plurality of surface mounted components are prone to fail due to the mist,
   an opening configured to expose the heat-generating components that are attached to the printed surface so that the heat generating components are located above the cover is formed in the cover in order to cool the heat-generating components located above the cover,
   the cover is provided with a protective wall that protrudes from an edge of the opening or from outside the edge and is configured to prevent the air blown by the fan from flowing through the opening to the surface mounted components that are located under the cover.

2. The motor driving device according to claim 1, wherein when the printed circuit board is viewed in a direction orthogonal to the printed surface, an area where the heat-generating component group is arranged and an area where the surface mounted component group is arranged at least partially overlap with each other.

* * * * *